Nov. 17, 1959
R. D. TORREY
2,913,598
TRANSISTOR-CORE LOGICAL ELEMENTS
Filed Nov. 4, 1955
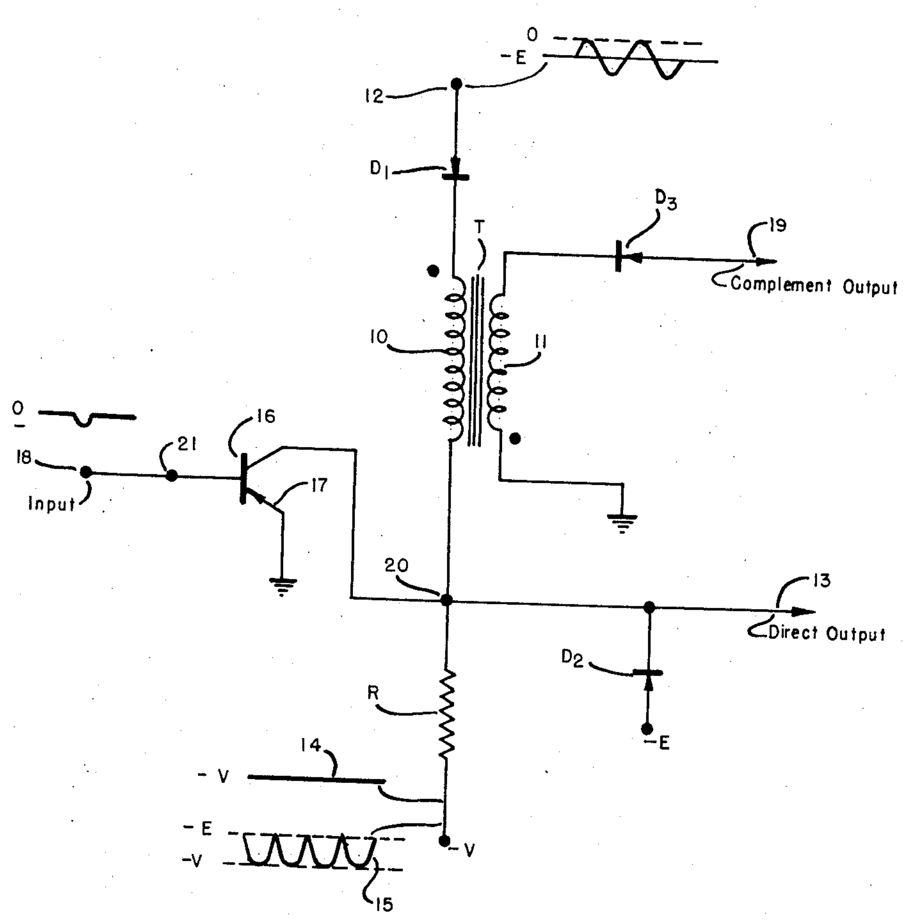
INVENTOR.
ROBERT D. TORREY
BY
Charles C. Engfid
AGENT United States Patent Office 2,913,598
Patented Nov. 17, 1959

2,913,598

TRANSISTOR-CORE LOGICAL ELEMENTS

Robert D. Torrey, Philadelphia, Pa., assignor to Sperry Rand Corporation, New York, N.Y., a corporation of Delaware Application November 4, 1955, Serial No. 544,949

23 Claims. (Cl. 307—88.5)

The present invention relates to logical elements such as may be employed in computing devices, and is more particularly concerned with a novel signal responsive element having power gain and capable of providing both direct and complement pulse type outputs.

It is often required in computing devices, for instance of the type employed in binary digital applications, to provide direct and complemented outputs in response to a signal input. In this respect, a direct output is defined as one occurring in response to the presence of a signal input; while a complement output is defined as one occurring only in the absence of a signal input. In the past, such outputs have been obtained through the use of relatively complex structure, and, in general, plural logical elements have been required for respectively providing each form of output.

In an attempt to obviate the foregoing complexity, various forms of logical elements have been suggested which are capable of effecting both a direct and complemented output in a single structure, and one such form of logical element has been taught in my copending application Serial No. 529,284, filed August 18, 1955, for: "Logical Elements" (EM-220). In this particular form of logical element, as described in my copending application, a transformer having three windings is employed; and one winding of the said three-winding transformer is coupled to a transistor whereby the state of conductivity of the transistor determines the effective impedance of the over-all transformer. A source of power pulses is coupled to one end of a second winding of the said transistor whereby direct outputs selectively appear at the other end of the said second winding; and complement outputs selectively appear across the third transformer winding in response to signal inputs applied to the aforementioned transistor.

While this form of logical element performs quite adequately, it is characterized by the disadvantages that a three-winding transformer is employed, thereby increasing somewhat the cost and complexity of the over-all system; and in addition, no means are provided for positively effecting cleanup in the transistor whereby the permissible repetition rate of the over-all logical element is somewhat reduced. The present invention provides an improved form of logical element, generally of the type described in my copending application Serial No. 529,284, which overcomes the foregoing disadvantages through the use of a two-winding transformer and through the use of circuit means so coupled to the transistor that clean-up is provided; and the logical element at the same time permits the desired power gain and direct and complement outputs to be effected.

It is accordingly an object of the present invention to provide an improved logical element for use in computation devices.

A further object of the present invention resides in the provision of a logical element providing both direct and complement outputs in response to the presence or absence of a signal input.

A still further object of the present invention resides in the provision of a logical element which is relatively simple in construction and which may be made in relatively small sizes.

A still further object of the present invention resides in the provision of a logical element comprising a two-winding transformer and transistor so interconnected with one another that direct and complemented outputs may be taken from plural points in the element in response to signal inputs selectively applied to the said transistor.

Still another object of the present invention resides in the provision of an improved logical element having better operating characteristics and capable of a higher frequency of operation than has been the case heretofore.

Another object of the present invention resides in the provision of a logical element having power gain and capable of effecting both direct and complement outputs.

A further object of the present invention resides in the provision of a logical element selectively providing both direct and complement outputs in a unitary circuit structure.

In providing for the foregoing objects and advantages, the present invention preferably employs a transformer having first and second windings thereon. A source of regularly occurring power pulses of predetermined polarity is coupled to one end of the said first winding, and the other end of the said first winding is selectively clamped at a desired reference potential corresponding to the reference potential of a direct output. A transistor is also coupled to this said other end of the first winding whereby the state of conductivity of the transistor effectively causes the direct output point to change from its aforementioned reference potential to a further potential, which further potential is so chosen that the power pulses are selectively ineffective in passing current through the first transformer winding. Complement outputs are in turn taken from the second transformer winding. The over-all arrangement is such that, in the absence of a signal input to the aforementioned transistor, each power pulse effects current flow through the first transformer winding thereby producing a complement output by transformer action across the second winding; while in response to a signal input applied to the transistor, the direct output point is raised from its clamped reference potential thereby giving a direct output and simultaneously preventing the passage of current through the said first transformer winding from the power pulse source.

As will subsequenty appear, the aforementioned clamp circuit, which is coupled to the said other end of the first transformer winding, is in turn also coupled to the control transistor whereby current flow through the clamp circuit provides clean-up of the transistor at proper times thereby permitting the over-all repetition rate of the logical element to be increased. The arrangement is therefore one wherein a logical element, exhibiting power gain and capable of providing both direct and complement outputs at a higher repetition rate than has been the case heretofore, is effected through the use of a simple two-winding transformer associated with various power sources of the type described.

The foregoing objects, advantages, construction and operation will become more readily apparent from a consideration of the accompanying drawing which illustrates a preferred embodiment of the present invention.

Thus, referring to the drawing, it will be seen that, in accordance with the present invention, a logical element providing power gain and giving both direct and complemented outputs may comprise a transformer T having a primary winding 10 and a secondary winding 11, the relative polarities of which are indicated. The upper end of primary winding 10 is coupled via a rectifier D1 to a power pulse source 12 having an R.F. output which may be sinusoidal, squarewave, or of other alternating configuration, and the said R.F. output exhibits regularly occurring positive and negative-going excursions centered about a potential magnitude of —E. The lower end of primary winding 10 is coupled to a clamp circuit comprising a current source employing potential source —V and resistor R, and a rectifier D2 returned to a steady state source —E. Source —E is less negative than the source —V, whereby current normally flows in the clamp circuit from —E via rectifier D2 and thence via resistor R to the source —V, thereby to clamp a direct output point 13 at a —E potential. As indicated in the drawing, the source —V may comprise either a D.C. potential 14 or may in the alternative comprise rectified A.C., such as that indicated at 15.

Also coupled to the lower end of primary winding 10 is a transistor 16 having its emitter 17 grounded and having selectively negative-going signal inputs applied to the base of the transistor 16 from a source 18. It will be appreciated that the particular arrangement of transistor 16 comprises one utilizing a grounded emitter connection, but that either grounded base or grounded collector connections may also be employed whereby the particular example shown in the drawing should be considered illustrative only. Similarly, although the transistor 16 has been illustrated as one of the P-N-P type, N-P-N transistors may be employed by reversing the several polarities already described and to be described in the circuit.

Secondary winding 11 of the transformer T has its upper end coupled via a rectifier D3 to a complement output point 19, while the lower end of the said secondary winding 11 is grounded as shown. The arrangement of this secondary winding 11 is therefore one wherein outputs will appear at complement output point 19 in response to the passage of current pulses through the primary winding 10; while the absence of such current pulses will be characterized by a similar absence of output pulses at point 19.

In operation it will be appreciated that the transistor 16 will be non-conductive in the absence of a negative-going signal applied to input point 18. When the transistor 16 is so non-conductive, direct output point 13 is maintained at a clamped —E potential by the circuit illustrated; and inasmuch as the power pulse source 12 exhibits regular positive-going excursions from a value —E to substantially zero potential, each such positive-going pulse will effect a pulse of current via rectifier D1 and primary winding 10 so long as the direct output point 13 is maintained at its clamped —E potential. Thus, in the absence of signal inputs, regular pulses of current will be effected through primary winding 10 and these current pulses will in turn induce, by transformer action, further pulses in secondary winding 11 which may be taken at output point 19. Inasmuch as these pulses appear at output point 19 in the absence of an input at terminal 18, the pulses so appearing at terminal 19 are complement outputs.

If now an input pulse should be applied at terminal 18, transistor 16 will be rendered conductive and this conductivity of the transistor 16 will cause the lower end 20 of primary winding 10 to rise to substantially the same potential as the emitter 17 of the said transistor, namely to ground potential. Direct output point 13 is thus raised from its clamped —E potential to substantially ground potential, thereby giving a direct output in response to a signal input appearing at terminal 18. By the same token, inasmuch as point 20 is raised to ground potential in response to a signal input, the rectifier D1 will be disconnected and no current will pass through the transformer winding 10, notwithstanding the presence of power pulses from the source 12. Thus, no output pulses appear at terminal 19.

To summarize the foregoing operation, therefore, regularly occurring pulses will appear at complement output point 19 in the absence of signal inputs at terminal 18, and during such absence of signal inputs the direct output point 13 will be maintained at a —E reference potential. In response to a signal input at terminal 18, however, complement output pulses no longer appear at terminal 19 and the direct output point 13 is raised from its —E potential to substantially ground potential thereby to give a direct output.

It will be noted that when the signal input at terminal 18 ceases, the collector of transistor 16 is effectively coupled to a negative potential —V through the resistor R and this connection of the transistor 16 imposes a negative potential of —E upon the collector of the transistor 16 thereby rapidly cleaning up the transistor after cessation of a signal input. If desired, this clean-up action may be enhanced, for instance, by injecting a positive clean-up pulse at a point 21. It should further be noted that logical elements of the type illustrated and described may be coupled to further elements of a similar type, or to other circuit components thereby to provide an over-all structure capable of performing a logical computation function. Due to the reference potential and to the polarity of this potential normally appearing at direct output point 13, however, this output point 13 should preferably be transformer or capacity coupled to other circuits in such a more complex arrangement. Also, when a circuit utilizing a transistor with grounded base connection is employed, a positive input signal will be required. The secondary output circuit would therefore be grounded at point 19, and output pulses will be taken from the lower end of secondary winding 11. In this configuration both the direct and complemented output pulses will be of the same polarity.

Still further modifications will be suggested to those skilled in the art, and it should therefore be emphasized that the foregoing discussion is meant to be illustrative only and should not be considered limitative of my invention; and all such modifications as are in accord with the principles discussed, are meant to fall within the scope of the appended claims.

Having thus described my invention, I claim:

1. In a logical element, a transformer having first and second windings inductively coupled to one another, a source of regularly occurring energization pulses coupled across said first winding, a first output terminal coupled to one end of said first winding, a second output terminal coupled to one end of said second winding, the other end of said second winding being coupled to a reference potential, clamp means coupled to said one end of said first winding for normally producing a reference potential difference interposed in series circuit with said source and of magnitude permitting said source to pass current pulses through said first winding whereby said current pulses passing through said first winding induce potentials in said second winding which appear as output pulses at said second output terminals, a transistor coupled to said clamp means, and means selectively applying signal inputs to said transistor to change its conductive state and thereby raise said reference potential difference sufficiently to prevent said energization source from passing current pulses through said first winding.

2. The combination of claim 1 wherein said source of energization pulses exhibits regularly occurring positive-going potential excursions from a negative potential level greater in magnitude than said reference potential difference, said transistor being adapted to raise selectively said one end of said first winding to a potential level at least equal to the maximum positive-going value of said energization pulses.

3. The combination of claim 1 wherein said transistor has a grounded emitter, means coupling the collector of said transistor to said clamp means, said signal inputs being applied to the base of said transistor.

4. In a logical element, a transformer having first and second windings inductively coupled to one another, a source of regularly occurring energization pulses coupled to one end of said first winding, clamp means coupled to the other end of said first winding for normally maintaining said other end at a reference potential permitting said source to pass current pulses through said first winding thereby to induce potentials which effect current flow in said second winding, a normally non-conductive transistor coupled to said other end of said first winding, and signal means coupled to said transistor for selectively rendering said transistor conductive thereby to alter the potential of said other end of said first winding from said reference potential whereby said current pulses in said first winding and said current flow in said second winding are simultaneously inhibited.

5. The combination of claim 4 wherein said source is coupled to said one end of said first winding by rectifier means.

6. The combination of claim 5 including a complement output terminal coupled to said second winding via further rectifier means.

7. The combination of claim 6 including a direct output terminal coupled to said other end of said first winding.

8. The combination of claim 7 wherein said transistor has a grounded emitter connection, the collector of said transistor being connected to said other end of said first winding.

9. In a logical circuit, a transformer having first and second windings inductively coupled to one another, first and second unilateral circuit means respectively connected in circuit with said first and second windings to limit the current flow in each of said windings to one direction, output means coupled to said second winding, a source of energization pulses coupled to one end of said first winding, clamp means coupled to the other end of said first winding for normally maintaining said other end at a first potential, a normally non-conductive transistor having one electrode coupled to said other end of said first winding, and signal means for selectively rendering said transistor conductive thereby to alter the potential of said other end of said first winding to a second potential, whereby said energization source effects pulses of current flow through said first winding when the said other end thereof is at one of its potential states thereby to induce pulsed output signals at the output means of said second winding, and said pulses of current are inhibited when the other end of said first winding is at the other of its potential states thereby to inhibit said induced output signals at the output means of said second winding.

10. The circuit of claim 9 wherein said one electrode of said transistor is directly connected to said other end of said first winding and to said clamp means, whereby said clamp means serves to clean up said transistor when said signal means is inoperative.

11. The circuit of claim 10 wherein said one electrode of said transistor comprises the collector thereof, the emitter of said transistor being grounded, whereby conduction of said transistor alters the potential of the other end of said first winding from its clamped first potential to one of substantially ground potential.

12. The circuit of claim 11 wherein said first potential is negative with respect to ground, said energization source exhibiting regularly occurring positive-going excursions from said negative first potential to substantially ground potential.

13. In a logical element, a transformer having first and second windings inductively coupled to one another, first output means coupled to one end of said first winding, second output means coupled to one end of said second winding, means for maintaining the other end of said second winding at a fixed reference potential, a source of regularly occurring energization pulses coupled to the other end of said first winding, potential clamp means coupled to said one end of said first winding whereby said energization source normally effects pulses of current in said first winding from said energization source to said clamp means, said current pulses in said first winding being operative to induce potentials in said second winding whereby induced pulses appear at said second output means, and signal responsive input means connected to said clamp means for selectively rendering said clamp means inoperative thereby to alter the potential at said first output means so as to produce an output signal at said first output means and simultaneously to inhibit the flow of said pulses of current in said first winding whereby no output signal appears at said second output means.

14. The combination of claim 13 wherein said input means comprises a normally non-conductive transistor.

15. In combination, a magnetic core having first and second windings thereon, means for maintaining one end of said first winding at a first reference potential, output means coupled to said second winding, a pulse source coupled to the other end of said first winding, rectifier means in series with said first winding, said pulse source exhibiting potential excursions from said first reference potential to a predetermined different potential whereby each of said excursions normally effect current flow via said first winding and rectifier means thereby to induce current flow in said second winding and said output means, and control means for selectively varying the potential at said one end of said first winding from said first reference potential to at least said predetermined different potential to cause said potential excursions of said pulse source to be ineffective to alter the current in said output means.

16. The combination of claim 15 wherein said last-named means includes a signal responsive transistor.

17. The combination of claim 15 wherein, said means for maintaining said one end of said first winding at said first reference potential comprises a potential clamp circuit normally holding said one end of said first winding at a selected potential, said control means comprising signal responsive means for selectively altering the potential at said one end of said first winding from said selected potential to said predetermined different potential, and another output means coupled to said one end of said first winding to provide another output corresponding to the variation of potential of said one end of said first winding from said selected potential to said predetermined different potential in response to said signal responsive means.

18. In combination, a magnetic core having first and second windings thereon, a source of energization pulses, a rectifier, a potential clamp circuit, means connecting said first winding, said source, said rectifier, and said potential clamp circuit in a series circuit whereby unidirectional current pulses from said source pass through said series circuit via said first winding to said potential clamp circuit, said unidirectional current pulses being operative to induce current flow in said second winding, and signal responsive control means coupled to said clamp circuit for selectively rendering said rectifier non-conductive thereby effectively to open said series circuit, whereby said induced current flow in said second winding is inhibited.

19. A logical element comprising a transformer having first and second winding inductively coupled, means for preventing current flow in said second winding except in response to current flow in said first winding of a certain direction, means for periodically establishing across said first winding a first potential difference which is of polarity to produce current flow in said certain direction in said first winding, means responsive to a control signal for establishing a second potential difference in series circuit with said first winding and of polarity and magnitude to prevent said current flow through said first winding that is produced in response to said first potential difference, first output connections coupled to said potential difference establishing means to produce a first output in response to said second potential difference, second output connections coupled to said second winding to produce an output signal responsive to the current flow in said certain direction in said first winding whereby an output signal is produced at said second output connections in response to said periodic first potential difference and in the absence of said control signal.

20. A logical element comprising a transformer having first and second windings inductively coupled to one another, a source of regularly occurring energization pulses coupled to one end of said first winding, a diode in series with said first winding and poled to carry current through said first winding from said source of energization, a first output coupled to the other end of said first winding, a second output coupled across said second winding, clamp means coupled to said other end of said first winding and operable to normally maintain said other end of said first winding at a potential lower than the most positive value of said source thereby to cause current flow from said source through said diode and said first winding during periods when said source is more positive than said fixed potential, said current flow causing a voltage to be induced into said second winding to produce said second output, control means operable to selectively disconnect said clamp means and establish at said other end of said first winding a potential at least equal to the most positive value of said source thereby to produce an output signal at said first output coincident with said selective disconnection of said clamp means.

21. A logical element comprising a transformer having first and second windings inductively coupled, a first and second unilateral current means in circuit with said first and second windings respectively, said unilateral means being poled to prevent current flow in said second winding except in response to current flow in said first winding in the forward direction of said first unilateral means, means for establishing in series with said first winding a first potential difference which is periodically of polarity and magnitude to produce current flow in said forward direction in said first winding, clamp means for establishing a second potential difference in series circuit with said first winding and said last named means, said second potential difference opposing said first potential difference and having a magnitude less than the peak value of said first potential difference to allow current flow through said first winding in response to said peak value, means responsive to a control signal for changing said second potential difference to a magnitude sufficient to prevent current flow through said first winding in response to said peak value of said first potential difference, first output connections coupled to said means for establishing a second potential difference to produce a first output signal responsive to said control signal, second output connections coupled to said second winding to produce a second output signal responsive to the current flow in said certain direction in said first winding whereby said second output signal is produced in response to said peak value of said periodic first potential difference and in the absence of said control signal.

22. A logical element comprising a transformer having first and second windings inductively coupled to one another, a source of regularly occurring energization pulses coupled to one end of said first winding, a diode in series with said first winding and poled to carry current through said first winding from said source of energization, a first output means coupled to the other end of said winding, a second output means coupled across said second winding, clamp means coupled to said other end of said first winding and operable to normally maintain said other end of said first winding at a potential lower than the most positive value of said source thereby to cause current flow from said source through said diode and said first winding during periods when said source is more positive than said fixed potential, said current flow causing a voltage to be induced into said second winding to produce a signal in said second output means, a normally non-conductive transistor coupled to said clamp means, control means operable to selectively energize said transistor to a conductive state to disconnect said clamp means and establish at said other end of said first winding a potential at least equal to the most positive value of said source thereby to produce a signal in said first output means coincident with the disconnection of said clamp means.

23. A logical element comprising a transformer having first and second windings inductively coupled, a first and second diode in series respectively with said first and second winding, an impedance element connected in a series circuit with said first winding and first diode, means for periodically establishing across said series circuit a first source of potential difference which is periodically of polarity to produce current flow in said first winding, a second source of potential difference of lesser magnitude than said first source of potential difference and of opposite polarity, a third diode interposed between a junction of said first winding and said impedance element and one end of said second source whereby said second source normally maintains said junction at a fixed potential from the other end of said impedance element, transistor means responsive to a control signal for establishing a potential difference across said impedance of polarity and magnitude to prevent current flow through said first winding in response to said first source of potential difference, first output connections coupled to said junction to produce a first output signal in response to said control signal, second output connections coupled to said second winding to produce a second output signal responsive to the current flow in said first winding whereby said second output signal is produced in response to said periodic first source potential difference and in the absence of said control signal.

References Cited in the file of this patent

UNITED STATES PATENTS

| | | |
|---|---|---|
| 2,709,798 | Steagall | May 31, 1955 |
| 2,713,674 | Schmitt | July 19, 1955 |
| 2,780,767 | Janssen | Feb. 5, 1957 |
| 2,797,261 | Polyzou | June 25, 1957 |
| 2,806,964 | Spades et al. | Sept. 17, 1957 |
| 2,807,718 | Chressanthis et al. | Sept. 24, 1957 |

OTHER REFERENCES

Proceedings of the I.R.E., vol. 40, No. 11, page 1591, Fig. 9.

Proceedings of I.R.E., May 1950, pp. 511–514, "Diode Coincidence and Mixing Circuits in Digital Computers."

Radio-Electronic Engineering, February 1954, pp. 13, 14, 15 and 30, "Transistor Control of Magnetic Amplifiers."